(12) United States Patent
Acharya (10) Patent No.: US 6,628,827 B1
(45) Date of Patent: Sep. 30, 2003

(54) METHOD OF UPSCALING A COLOR IMAGE

(75) Inventor: Tinku Acharya, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/461,080

(22) Filed: Dec. 14, 1999

(51) Int. Cl.$^7$ ................................................ G06K 9/00
(52) U.S. Cl. ........................ 382/167; 382/240; 382/299; 382/300; 348/273
(58) Field of Search ................................. 382/162, 298, 382/299, 300, 239, 167, 166, 240, 199, 254, 255, 277, 248, 276, 246; 345/589, 600, 601, 602, 603, 604, 660, 667, 671; 348/581, 582, 273; 358/518, 519, 520, 521, 522, 523, 524, 525

(56) References Cited

U.S. PATENT DOCUMENTS

| | | |
|---|---|---|
| 5,014,134 A | 5/1991 | Lawton et al. |
| 5,321,776 A | 6/1994 | Shapiro |
| 5,392,255 A | 2/1995 | LeBras et al. |
| 5,398,066 A | 3/1995 | Martinez-Uriegas et al. |
| 5,491,561 A | 2/1996 | Fukuda |
| 5,541,653 A | 7/1996 | Peters et al. |
| 5,602,589 A | 2/1997 | Vishwanath et al. |
| 5,706,220 A | 1/1998 | Vafai et al. |
| 5,729,691 A * | 3/1998 | Agarwal ..................... 709/247 |
| 5,737,448 A | 4/1998 | Gardos |
| 5,875,122 A | 2/1999 | Acharya |
| 5,892,847 A | 4/1999 | Johnson |
| 5,901,242 A | 5/1999 | Crane et al. |
| 5,995,210 A | 11/1999 | Acharya |
| 6,002,446 A * | 12/1999 | Eglit ........................ 348/581 |
| 6,009,201 A | 12/1999 | Acharya |
| 6,009,206 A | 12/1999 | Acharya |
| 6,047,303 A | 4/2000 | Acharya |
| 6,091,851 A | 7/2000 | Acharya |

(List continued on next page.)

OTHER PUBLICATIONS

H. H. Nguyen, P. Cohen, "Gibbs Random Fields, Fuzzy Clustering, and the Unsupervised Segmentation of Textured Images," Graphical Models and Image Processing, Vol 55, No. 1, pps. 1–19, Jan. 1993.

C. Jawahar, A. Ray, "Techniques and Applications of Fuzzy Statistics in Digital Image Analysis," Fuzzy Theory Systems: Techniques and Applications, vol. 2, pps. 759–778, 1999.

S. K. Pal, A. Ghosh, "Image Segmentation Using Fuzzy Correlation," Information Sciences No. 62, pps. 223–250, 1992.

U.S. patent application Ser. No. 08/130,243, Acharya, filed Aug. 6, 1998.

U.S. patent application Ser. No. 08/963,335, Goldstein et al., filed Nov. 3, 1997.

(List continued on next page.)

Primary Examiner—Bhavesh M. Mehta
Assistant Examiner—Ali Bayat
(74) Attorney, Agent, or Firm—Blakely, Sokoloff, Taylor & Zafman LLP (57) ABSTRACT

A method of upscaling a color image in a first color space format to a second color space format may include the following. A color image in a first color space format may be transformed to a second color space format. At least one color plane of the transformed color image may be upscaled, the at least one color plane corresponding to one of the color space dimensions of the second color space format, to provide an upscaled color image in the second color space format. Of course, many other embodiments other than the preceding embodiment are also within the scope of the present invention.

20 Claims, 4 Drawing Sheets

U.S. PATENT DOCUMENTS

| | | | |
|---|---|---|---|
| 6,094,508 A | 7/2000 | Acharya et al. | |
| 6,108,453 A | 8/2000 | Acharya | |
| 6,124,811 A | 9/2000 | Acharya et al. | |
| 6,130,960 A | 10/2000 | Acharya | |
| 6,151,069 A | 11/2000 | Dunton et al. | |
| 6,151,415 A | 11/2000 | Acharya et al. | |
| 6,154,493 A | 11/2000 | Acharya et al. | |
| 6,166,664 A | 12/2000 | Acharya | |
| 6,178,269 B1 | 1/2001 | Acharya | |
| 6,195,026 B1 | 2/2001 | Acharya | |
| 6,208,350 B1 * | 3/2001 | Herrera | 345/582 |
| 6,215,908 B1 | 4/2001 | Pazmino et al. | |
| 6,215,916 B1 | 4/2001 | Acharya | |
| 6,229,578 B1 | 5/2001 | Acharya et al. | |
| 6,233,358 B1 | 5/2001 | Acharya | |
| 6,236,433 B1 | 5/2001 | Acharya et al. | |
| 6,236,765 B1 | 5/2001 | Acharya | |
| 6,259,819 B1 * | 7/2001 | Andrew et al. | 382/248 |
| 6,275,206 B1 | 8/2001 | Tsai et al. | |
| 6,285,796 B1 | 9/2001 | Acharya et al. | |
| 6,292,114 B1 | 9/2001 | Tsai et al. | |
| 6,301,392 B1 | 10/2001 | Acharya | |
| 6,348,929 B1 | 2/2002 | Acharya et al. | |
| 6,356,276 B1 | 3/2002 | Acharya | |
| 6,366,692 B1 | 4/2002 | Acharya | |
| 6,366,694 B1 | 4/2002 | Acharya | |
| 6,373,481 B1 | 4/2002 | Tan et al. | |
| 6,377,280 B1 | 4/2002 | Acharya et al. | |
| 6,381,357 B1 | 4/2002 | Tan et al. | |
| 6,392,699 B1 | 5/2002 | Acharya | |
| 6,411,333 B1 * | 6/2002 | Auld et al. | 348/441 |
| 6,535,648 B1 | 3/2003 | Acharya | |
| 2001/0019630 A1 | 9/2001 | Johnson | |

OTHER PUBLICATIONS

U.S. patent application Ser. No. 08/885,415, Acharya, filed Jun. 30, 1997.

U.S. patent application Ser. No. 09/008,131, Achara et al., filed Jan. 16, 1998.

U.S. patent application Ser. No. 09/018,601, Acharya, filed Feb. 4, 1998.

U.S. patent application Ser. No. 09/034,625, Acharya, filed Mar. 4, 1998.

U.S. patent application Ser. No. 09/163,022, Acharya et al., filed Sep. 29, 1998.

U.S. patent application Ser. No. 08/978,786, Acharya et al., filed Nov. 26, 1997.

U.S. patent application Ser. No. 09/482,551, Acharya et al., filed Jan. 13, 2000.

U.S. patent application Ser. No. 08/963,525, Acharya, filed Nov. 3, 1997.

S. K. Pal, N. R. Pal, "Segmentation Based on Measures of Contrast, Homogeneity, and Region Size," IEEE, vol. SMC–17, No. 5, pps. 857–868, Sep./Oct. 1987.

M. Trivedi, J. Bezdek, "Low–Level Segmentation of Aerial Images with Fuzzy Clustering," IEEE Transactions on Systems, Man, and Cybernetics, vol. SMC–16, No. 4, pps. 589–597, Jul./Aug. 1986.

H.J. Zimmermann, "Fuzzy Set Theory and Its Applications (Second, Revised Edition)," Allied Publishers Limited, pps. 34–35, 46–49.

U.S. patent application Ser. No. 09/482,552, Acharya, filed Jan. 13, 2000.*

U.S. patent application Ser. No. 08/114,720, Acharya, filed Jul. 13, 1998.*

U.S. patent application Ser. No. 09/050,743, Acharya, filed Mar. 30, 1998.*

U.S. patent application Ser. No. 09/963,097, Booth et al., filed Nov. 3, 1997.*

U.S. patent application Ser. No. 08/986,761, Acharya et al., filed Dec. 8, 1997.*

U.S. patent application Ser. No. 09/154,176, Acharya, filed Sep. 16, 1998.*

U.S. patent application Ser. No. 08/963,334, Acharya, filed Nov. 3, 1997.*

U.S. patent application Ser. No. 08/986,461, Acharya et al., filed Dec. 8, 1997.*

U.S. patent application Ser. No. 09/258,636, Acharya et al., filed Feb. 26, 1999.*

U.S. patent application Ser. No. 09/048,901, Acharya, filed Mar. 26, 1998.*

U.S. patent application Ser. No. 09/040,806, Acharya, filed Mar. 18, 1998.*

U.S. patent application Ser. No. 09/301,753, Acharya et al., filed Apr. 29, 1999.

U.S. patent application Ser. No. 09/083,383, Acharya et al., filed May 21, 1998.

U.S. patent application Ser. No. 09/109,475, Acharya, filed Jul. 2, 1998.

U.S. patent application Ser. No. 09/140,517, Acharya, filed Aug. 26, 1998.

U.S. patent application Ser. No. 09/129,728, Acharya, filed Aug. 5, 1998.

U.S. patent application Ser. No. 09/146,159, Acharya, filed Sep. 3, 1998.

U.S. patent application Ser. No. 09/152,703, Acharya, filed Sep. 14, 1998.

U.S. patent application Ser. No. 09/126,203, Bawolek et al., filed Jul. 30, 1998.

U.S. patent application Ser. No. 09/258,118, Vavro et al., filed Feb. 24, 1999.

U.S. patent application Ser. No. 09/207,753, Acharya, filed Dec. 8, 1998.

U.S. patent application Ser. No. 09/272,751, Acharya et al., filed Mar. 17, 1999.

U.S. patent application Ser. No. 09/165,511, Acharya et al., filed Oct. 2, 1998.

U.S. patent application Ser. No. 09/199,836, Bawolek et al., filed Nov. 24, 1998.

U.S. patent application Ser. No. 09/320,192, Acharya et al., filed May 26, 1999.

U.S. patent application Ser. No. 09/211,309, Acharya et al., filed Dec. 14, 1998.

U.S. patent application Ser. No. 09/438,091, Acharya et al., filed Nov. 10, 1999.

U.S. patent application Ser. No. 09/342,863, Acharya et al., filed Jun. 29, 1999.

U.S. patent application Ser. No. 09/191,310, Acharya et al., filed Nov. 13, 1998.

U.S. patent application Ser. No. 09/383,117, Acharya et al., filed Aug. 25, 1999.

U.S. patent application Ser. No. 09/291,810, Acharya, filed Apr. 14, 1999.

U.S. patent application Ser. No. 09/292,763, Acharya et al., filed Apr. 14, 1999.

U.S. patent application Ser. No. 09/390,255, Acharya et al., filed Sep. 3, 1999.

U.S. patent application Ser. No. 09/329,632, Acharya et al., filed Jun. 10, 1999.

U.S. patent application Ser. No. 09/328,935, Acharya et al., filed Jun. 9, 1999.
U.S. patent application Ser. No. 09/359,831, Acharya et al., filed Jul. 23, 1999.
U.S. patent application Ser. No. 09/359,523, Acharya et al., filed Jul. 23, 1999.
U.S. patent application Ser. No. 09/406,032, Acharya, filed Sep. 27, 1999.
U.S. patent application Ser. No. 09/410,800, Acharya et al., filed Oct. 1, 1999.
U.S. patent application Ser. No. 09/411,697, Acharya et al., filed Oct. 1, 1999.
U.S. patent application Ser. No. 09/461,080, Acharya, filed Dec. 14, 1999.
U.S. patent application Ser. No. 09/461,068, Acharya, filed Dec. 14, 1999.
U.S. patent application Ser. No. 09/432,337, Acharya, filed Nov. 2, 1999.
U.S. patent application Ser. No. 09/429,058, Acharya et al., filed Oct. 29, 1999.
U.S. patent application Ser. No. 09/467,487, Acharya et al., filed Dec. 20, 1999.
U.S. patent application Ser. No. 09/467,611, Acharya et al., filed Dec. 20, 1999.
U.S. patent application Ser. No. 09/473,643, Acharya et al., filed Dec. 28, 1999.
U.S. patent application Ser. No. 09/494,087, Acharya, filed Jan. 28, 2000.
U.S. patent application Ser. No. 09/507,213, Acharya et al., filed Feb. 25, 2000.
U.S. patent application Ser. No. 09/507,399, Acharya et al., filed Feb. 25, 2000.
U.S. patent application Ser. No. 09/519,135, Acharya et al., filed Mar. 6, 2000.
U.S. patent application Ser. No. 09/519,874, Acharya et al., Mar. 6, 2000.
Li, X. Q., et al., "A Fuzzy Logic Approach to Image Segmentation", IEEE, 1994, pp 337–341.
Acharya, T., et al., "A New Block Matching Based Color Interpolation Algorithm", pp 1–3.
Adams, James E., Jr, "Interactions Between Color Plane Interpolation and Other Image Processing Functions in Electronic Photography", SPIE, pp 144–151, vol. 2416.
Chapter 4, "Image Processing and Machine Vision", pp 327–330.
Rosenfeld, Azriel, "Fuzzy Digital Topology", Reprinted from Inform. Control, vol. 40, No. 1, pp 331–339, 1979.
Rosenfeld, Azriel, "The Fuzzy Geometry of Image Subsets", Reprinted from Pattern Recognition Letters, vol. 2, pp 340–346, Sep. 1984.
Dyer, C. R., et al., "Thinning Algorithms for Gray–Scale Pictures", Reprinted from IEEE Tans. Pattern Anal. Machine Intell., vol. PAMI–1, No. 1, pp 347–348, Jan. 1979.
Pal, S. K., et al., "Image Enhancement Using Smoothing with Fuzzy Sets", Reprinted from IEEE Tans. Syst., Man, Cybern., vol. SMC–11, No. 7, pp 349–356, Jul. 1981.
Li, H., et al., "Fast and Reliable Image Enhancement Using Fuzzy Relaxation Technique", Reprinted from IEEE Trans. Syst., Man, Cybern., vol. SMC–19, No. 5, pp 357–361, Sep./Oct. 1989.
Tanaka, K., et al., "A Study on Subjective Evaluations of Printed Color Images", Reprinted from Int'l J. Approximate Reasoning, vol. 5, No. 3, pp 362–368, 1991.
Pal, K, et al., "Image Enhancement and Thresholding By Optimization of Fuzzy Compactness", Reprinted from Pattern Recognition Letters, vol. 7, pp 369–378, Feb. 1988.

Lim, Y. W., et al., "On the Color Image Segmentation Algorithm Based on the Thresholding and the Fuzzy c–Means Techniques", Reprinted from Pattern Recognition, vol. 23, No. 9, pp 379–396, 1990.
Huntsberger, T. L., et al., "Representation of Uncertainty in Computer Vision Using Fuzzy Sets", Reprinted from IEEE Trans. Comput., vol. C–35, No. 2, pp 397–407, Feb. 1986.
Acharya, Tinku, "A Memory Based VLSI Architecture for Image Compression", App. No. 08/885,415, Filed Jun. 30, 1997, 37 pgs.
Bawolek, E. J., et al., "Infrared Correction System", Appl. No. 09/126,203, Filed Jul. 30, 1998, 23 pgs.
Tan, Y., et al., "Robust Sequential Approach in Detecting Defective Pixels Within An Image Sensor", App. No. 09/191,310, Filed Nov. 13, 1998, 35 pgs.
Acharya, T., et al., "Color Interpolation for a Four Color Mosaic Pattern", App. No. 09/199,836, Filed Nov. 24, 1998, 26 pgs.
Acharya, Tinku, "A Mathematical Model for Gray Scale and Contrast Enhancement of a Digital Image", App. No. 09/207,753, Filed Dec. 8, 1998, 28 pgs.
Tan, Y., et al., "Using an Electronic Camera to Build a File Containing Text", App. No. 09/301,753, Filed Apr. 29, 1999, 21 pgs.
Tsai, P., et al., "Method and Apparatus for Adaptively Sharpening an Image", App. No. 09/320,192, Filed May 26, 1999, 29 pgs.
Tan, Y., et al., "Method and Apparatus for Adaptively Sharpening Local Image Content of an Image", App. No. 09/328,935, Filed Jun. 9, 1999, 29 pgs.
Acharya, T., et al., "Image Processing Method and Apparatus", App. No. 09/359,523, Filed Jul. 23, 1999, 16 pgs.
Tan, Y., et al., "A Methodology for Color Correction with Noise Regulation", App. No. 09/359,831, Filed Jul. 23, 1999, 30 pgs.
Acharya, T., et al., "Square Root Raised Cosine Symmetric Filter for Mobile Telecommunications", App. No. 09/429,058, Filed Sep. 2, 1999, 26 pgs.
Acharya, Tinku, "Discrete Filter", App. No. 09/432,337, Filed Sep. 2, 1999, 12 pgs.
Acharya, T., et al., "Zerotree Encoding of Wavelet Data", App. No. 09/390,255, Filed Sep. 3, 1999, 21 pgs.
Acharya, T., et al., "A Fuzzy Distinction Based Thresholding Technique for Image Segmentation", App. No. 09/393,017, Filed Sep. 10, 1999, 29 pgs.
Acharya, T., et al., "A Fuzzy Based Thresholding Technique for Image Segmentation", App. No. 09/393,136, Filed Sep. 10, 1999, 28 pgs.
Acharya, Tinku, "Video Motion Estimation", App. No. 09/406,032, Filed Sep. 27, 1999, 24 pgs.
Acharya, T., et al., "Method of Compressing a Color Image", App. No. 09/411,697, Filed Oct. 1, 1999, 26 pgs.
Acharya, T., et al., "Method of Interpolating Color Pixel Signals From a Subsampled Color Image", App. No. 09/410,800, Filed Oct. 1, 1999, 20 pgs.
Acharya, T., et al., "Indexing Wavelet Compressed Video For Efficient Data Handling", App. No. 09/438,091, Filed Nov. 10, 1999, 29 pgs.
Acharya, Tinku, "Method of Converting a Sub–sampled Color Image", App. No. 09/461,068, Filed Dec. 14, 1999, 22 pgs.

* cited by examiner

METHOD OF UPSCALING A COLOR IMAGE

RELATED APPLICATION

This patent application is related to concurrently filed U.S. patent application Ser. No. 09/461,068, titled "Method of Converting a Sub-Sampled Color Image," by Acharya, assigned to the assignee of the current invention and herein incorporated by reference.

BACKGROUND

This disclosure relates to color conversion and, more particularly, to converting from a color image in a first color space format to an upscaled color image in a second color space format.

As is well-known, in a variety of circumstances, it is a desirable to apply a technique to convert from one color space format to another color space format for a full color image. For example, a camera or other imager, that has the capability of creating a color image, may produce the image in a red, green, blue (RGB) color space format. However, for transmission, it may be desirable to comply with a frequently employed International Telecommunications Union (ITU) communications standard, such as the H.263 Standard for Video Coding Suitable for Video Teleconferencing. Such standards typically employ different color space formats, such as the YUV color space format or some other variation. In addition, it is sometimes desirable to upscale the color image so that it may be viewed on larger displays or similar other devices. Unfortunately, such upscaling may result in a blurred image and is often relatively computational complex, which undesirably may consume excess power in situations where power is a limited resource, such as on a laptop computer, for example. These issues may be further exacerbated if, in addition, to upscaling, color space format conversion, as previously described, is to take place. A need exists for relatively efficient techniques for creating an upscaled full color image of good quality from a color image in a different color space format.

BRIEF DESCRIPTION OF DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention.

As previously indicated, for a color image, typically each pixel signal value is represented by three independent color components, such as a red component, a green component, and a blue component, for example, although the invention is not limited in scope to these color components or to a particular color space format. Frequently, it may then be desirable to both upscale that color image and transform it to another color space format. Therefore, for a color image captured by an imaging device, each pixel may be represented by a 24 bit color signal, 8 bits for each of the red, green, and blue color components, for example, although the invention is not restricted in scope by this example. In order to produce such a upscaled color image containing 24 bit signal information comprising the three color components, for example, signal interpolation, such as bi-linear or bi-cubic interpolation, for example, may be employed. These approaches, however, are computationally quite complex, at least in part because the upscaling operation is applied to all three color planes in the color space format, and may also tend to blur the resulting image. If an upscaled color image is obtained in this manner, a transformation into a different color space format may then be employed, such as where it may be desirable to comply with certain image processing specifications and/or standards. Examples of these include standards provided by the ITU (International Telecommunication Union), or ISO (International Standard Organization). Likewise, it is also typical to represent color images in a Luminance-Chrominance (L-C) form in order to reduce the storage requirements by removing redundant color signal information that may be present in the image, typically present in the Chrominance color components. One widely used L-C color space format is the Y-Cr-Cb 4:2:0 representation. To accomplish this, it is common to decimate the chrominance planes (Cr and Cb) usually by dropping every alternate row and column of the chrominance planes of the upscaled color image. As a result, potentially significant color signal information may be lost when this process is applied.

Disadvantages of current techniques to produce an upscaled color image in a different color space formation include (1) the loss of signal information, sometimes producing blurring, as a result of applying the particular technique, and/or (2) high computational complexity, which also may typically consume excessive power when employed or performed by a computing engine, and/or (3) internal buffering large enough to store the signal information for the upscaled color planes and also after color space conversion but before decimation. These disadvantages will be explained in more detail hereinafter. An embodiment of upscaling a color image in accordance with the present invention may avoid at least some of these disadvantages.

Figure 1:
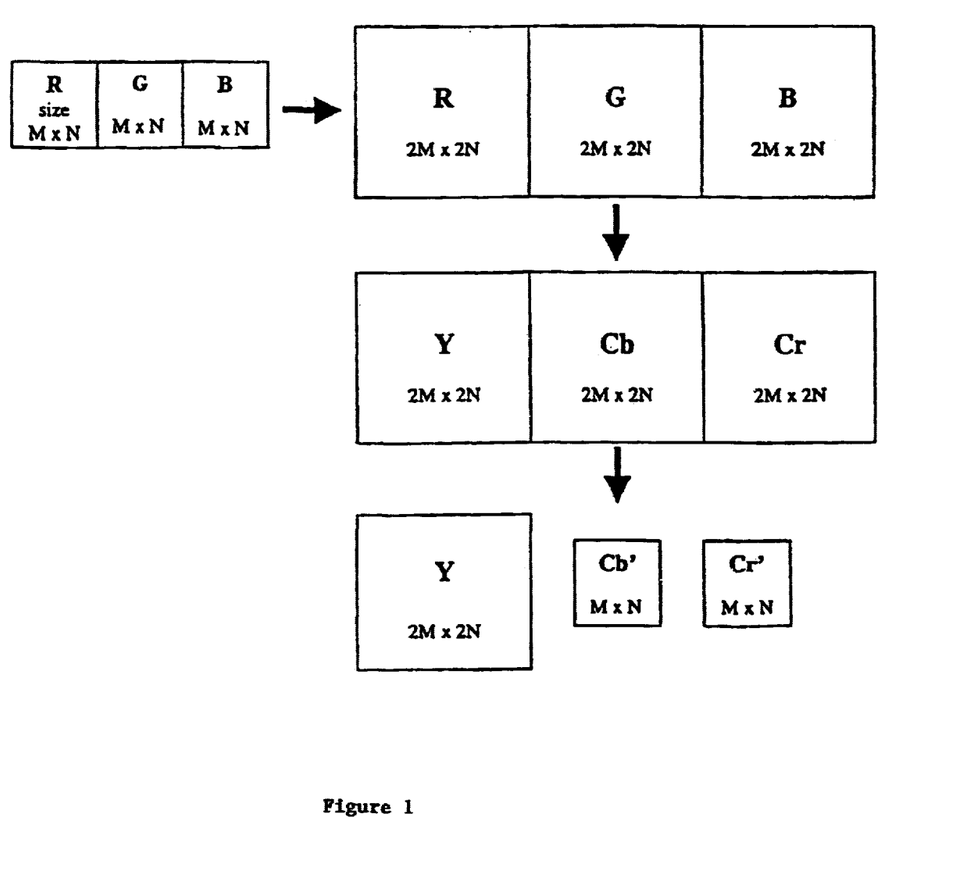
FIG. 1 is a schematic diagram illustrating one technique for producing an upscaled full color image converted from another color space format.

As is well-known, a typical interpolation method or process, such as the well-known bi-linear or bi-cubic interpolation, for example, generates a upscaled color digital image comprising three color planes, red, green, and blue, each of size 2M×2N from an M×N full color image. Of course, these are just examples of a color upscaling interpolation process. There are a wide number of upscaling interpolation techniques that may be employed. In typical approaches, the color signal information of the neighboring pixels are employed to generate the desired color signal information, although, of course, the invention is not limited in scope in this respect. FIG. 1 illustrates a process in which a full color image is used to produce an upscaled color image in another color space format.

Subsequently, for the approach illustrated in FIG. 1, an upscaled color image is converted to a Luminance-Chrominance (L-C) color space format, such as Y-Cr-Cb 4:2:0, to meet color specifications or criteria, such as provided, for example, in the H.263 ITU standard, applied in video conferencing applications. Of course, the invention is not restricted in scope in this respect. The color space format conversion from 24 bit RGB color space format to 12 bit Y-Cr-Cb 4:2:0 color space format is done using the following transformation:

$$Y(I,J)=0.299R(I,J)+0.587G(I,J)+0.114B(I,J)$$

$$Cr(I,J)=-0.169R(I,J)-0.331G(I,J)+0.500B(I,J) \quad [1]$$

$$Cb(I,J)=0.500R(I,J)-0.419G(I,J)-0.081B(I,J)$$

where R,G, and B denote different color planes in the RGB color space format, Y, Cr, and Cb denote different color planes in the Y-Cr-Cb 4:2:0 color space format, and I,J denote pixel locations The Cr and Cb image planes are then, in this particular approach, decimated by dropping alternate rows and columns from each chrominance plane (Cb and Cr), as illustrated by Cr' or Cb' in FIG. 1. This generates the Y-Cr-Cb image in 4:2:0 color space (12 bit color) format. The reason for 12 bits for each pixel in Y-Cr-Cb 4:2:0 color space is that for every 4 luminance (Y) pixels (1 byte each for each luminance value) in this format there is 1 value (1 byte each) for each corresponding chrominance channel (Cb and Cr in this example). Hence, 4 full color pixels in this format are represented by 6 bytes or 48 bits. As a result, each pixel in Y-Cr-Cb color space format is considered to have 12 bits.

Assume that the average number of operations per pixel for upscaling in each color place is "K", when using a known upscaling technique. Then, for each pixel location, the total number of operations to upscale the full color image using this approach is $3K \times (M \times N)$, where "x" denotes multiplication. The total number of multiplications for color conversion is $9(2M \times 2N)$, or $36(M \times N)$. Therefore, ignoring the computation for decimation, the typical number of operations for upscaling followed by color conversion is more than $3(K+12)M \times N$. Likewise, the memory buffer size employed for hardware and/or software implementation of this approach is $3(2M \times 2N)$ or $12M \times N$.

Figure 2:
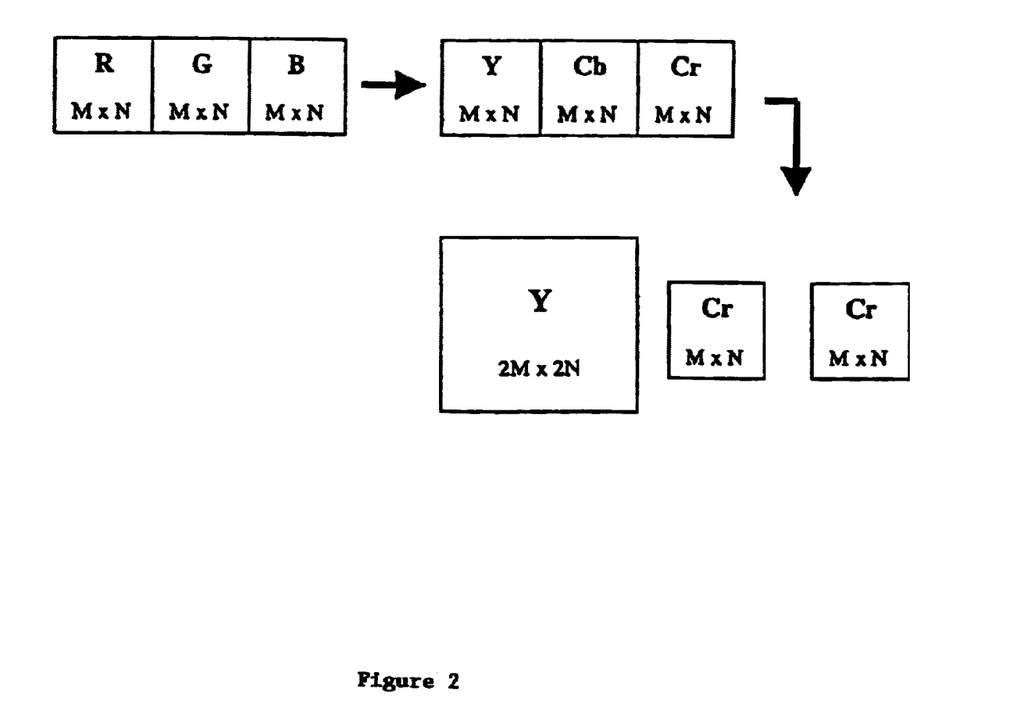
FIG. 2 is a schematic diagram illustrating a technique of upscaling a color image in accordance with the present invention.

FIG. 2 illustrates an embodiment in accordance with the present invention. Of course, the invention is not limited in scope to this particular embodiment. A full color image in a first color space format is first transformed to a second color space format, such as Y-Cr-Cb color space format, without applying a decimation operation, as in FIG. 1. Then, at least one of the color space dimensions in the transformed image (luminance in Y-Cr-Cb format) is "up-scaled" to provide a full color image in the second color space format. In this context, the term up-scaled refers to a process applied to a color plane of a color dimension in a particular color space format whereby the color signal information in the color plane is retained, but spread or distributed over a color plane of larger dimensions. For example, for the embodiment illustrated in FIG. 3, the Y so plane of size M×N is upscaled using a discrete wavelet transform (DWT) based upsampling technique in order to generate a M×N Y—Cb—Cr 4:2:0 color image. Of course, the invention is not limited in scope to using the discrete wavelet transform and many other upsampling techniques may be employed, such as bi-linear interpolation, bi-cubic interpolation, weighted averaging, etc. An advantage of this particular approach is that the chrominance plane is not decimated and, hence, there is no significant loss of signal information, as would typically occur. Even if another upsampling technique were employed, a additional loss of signal information would occur using the approach of FIG. 1, instead of this particular embodiment, for example.

Figure 3:
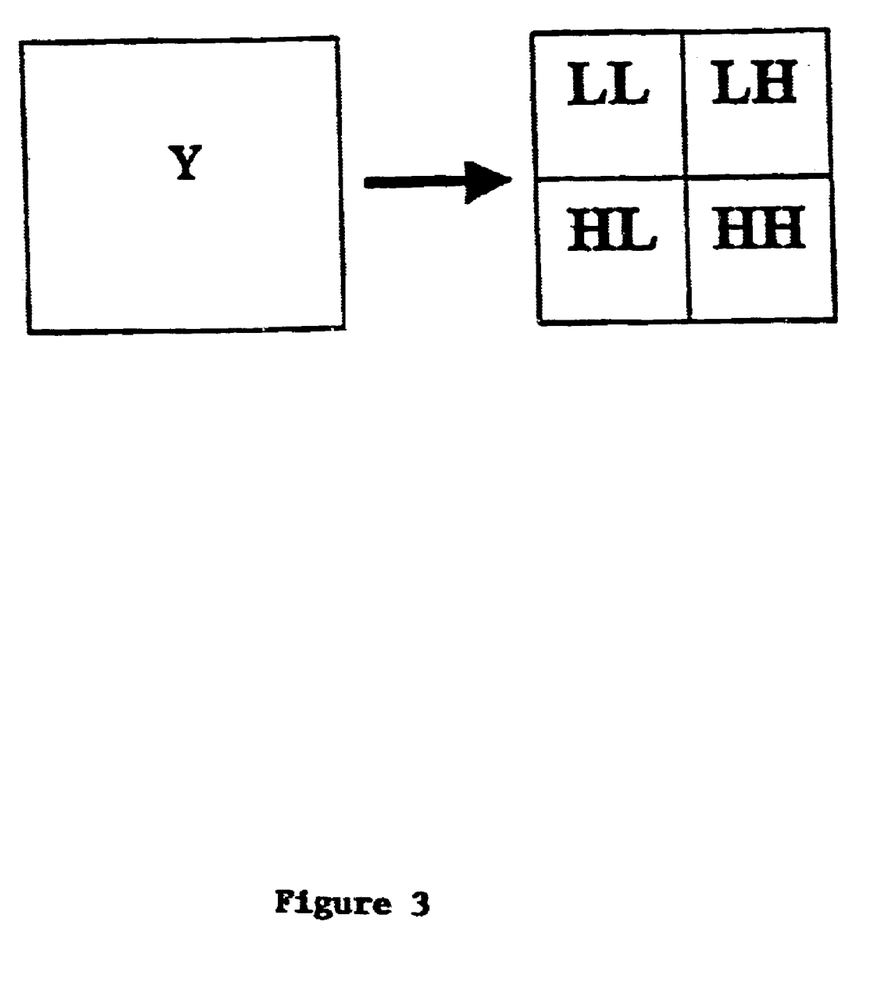
FIG. 3 is a schematic diagram illustrating an embodiment of the discrete wavelet transform (DWT)
Figure 4:
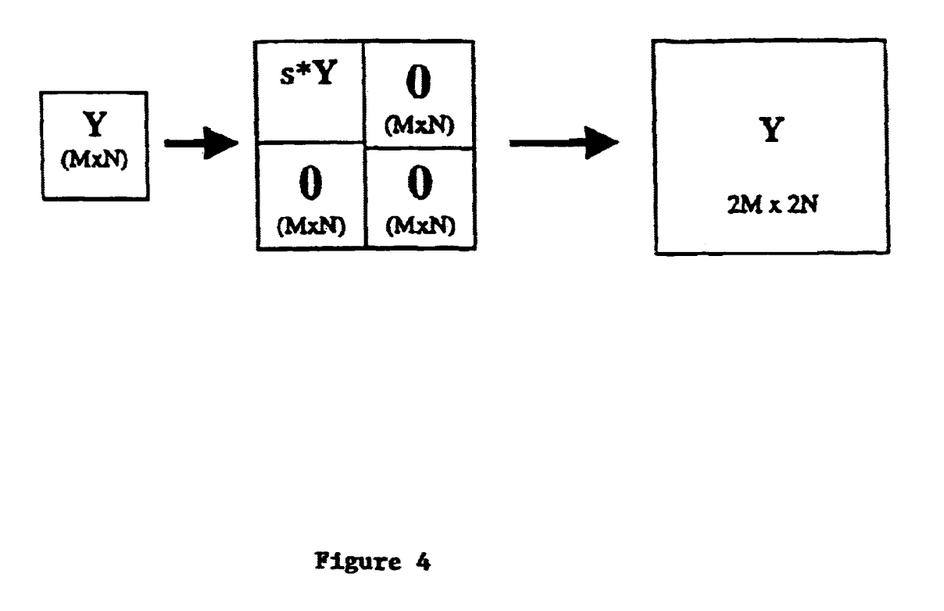
FIG. 4 is a schematic diagram illustrating one aspect of an embodiment of upscaling a color image in accordance with the present invention.

Of course, this particular embodiment does not use bi-linear or bi-cubic interpolation to upscale. In the particular embodiment, the properties of the inverse discrete wavelet transform (IDWT) are employed. See, for example, M. Antonini, M. Barlaud, P. Mathieu, and I. Daubechies, "Image Coding Using Wavelet Transform", *IEEE Transactions on Image Processing*, Vol. 1, No. 2, April 1992, pp. 205–220. FIG. 3 is a schematic diagram that illustrates the decomposition of an image (I) using the DWT into 4 subbands, LL, LH, HL, and HH. The LL subband, size M/2×N/2 in this particular embodiment, may be considered at a subsampled or decimated version of the original image (I) of size M×N. In this embodiment, the other subband, HL, LH and HH, comprise high frequency subbands and, therefore, include high frequency edge signal information and noise. A close approximation of the original image may be obtained from the LL subband by approximating the other subbands, LH, HL, and LL, with zeros and applying the inverse DWT to obtain I'. This technique may then be applied to the Y plane to perform upscaling, by letting the LL subband of the upscaled image comprise the Y plane and appending three zero subbands, LH, HL, and HH, as illustrated in FIG. 4. It is noted that a constant factor, s, is applied depending upon the DWT filters applied, where s is the absolute sum of the low pass filter coefficients for the inverse DWT. This parameter may, in some embodiments, be dynamically modifiable depending on the applied filter and application criteria. Thus, the Y plane may be upsampled to generate a 2M×2N sized Y-plane by applying an inverse DWT to the original Y plane with artificially generated LH, HL, and HH subbands. This technique for performing this upscaling is described in greater detail in a prior patent application "A DWT-based Up-Sampling Algorithm Suitable For Image Display In An LCD panel" by Acharya, filed on Aug. 5, 1998, U.S. patent application Ser. No. 09/129, 728, assigned to the assignee of the present invention, although the invention is not limited in scope in this respect. As previously indicated any one of a number of techniques to perform the upscaling may be employed. Furthermore, other approaches to apply the inverse DWT to upscale may also be employed.

It is noted that the computational complexity of this approach and the amount of storage space utilized is significantly less than the previous approach. As discussed above, the total number of multiplications for color conversion is 9M×N and the total number of operations for upscaling in this embodiment is KM×N. Hence, the total number of operations for this particular embodiment is (k+9)M×N, which is less than one-third of the approach previously described in terms of computational complexity. Likewise, the storage space employed to implement this approach is 6M×N or about half of the approach previously described.

As previously indicated, an embodiment of a method of upscaling color image in accordance with the invention provides a number of advantages. A computationally complex color upscaling scheme applied to the full image is avoided totally and, instead, an upscaling scheme is applied to a reduced set of data. Likewise, dropping rows and columns from the upscaled full color image is also omitted. The reduction in computational complexity is more than 66%, and in memory storage space is about 50%. Therefore, this approach may be applied to virtually any digital signal processing architecture or similar computing engine and may reduce computational complexities suitable for real-time application and low power applications, such as may be desirable for handheld devices, with generally no significant loss of signal information.

It will, of course, be understood that, although a particular embodiment has just been described, the invention is not limited in scope to a particular embodiment or implementation. For example, one embodiment may be in hardware, whereas another embodiment may be in software. Likewise, an embodiment may be in firmware, or any combination of hardware, software, or firmware, for example. Likewise, although the invention is not limited in scope in this respect, one embodiment may comprise an article, such as a storage medium. Such a storage medium, such as, for example, a CD-ROM, or a disk, may have stored thereon instructions, which when executed by a system, such as a computer system or platform, or an imaging system, may result in a method of upscaling a color image in accordance with the invention, such as, for example, the embodiment previously described.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A method of upscaling a color image in a first color space format to a second color space format comprising:

transforming the color image in the first color space format to the second color space format; and applying an upscaling scheme to a subset of the data representing the transformed color image, the subset of the data being less than the whole of the data representing the transformed color image and including at least one color plane of the transformed color image, the at least one color plane corresponding to one of the color space dimensions of the second color space format.

2. The method of claim 1, wherein the first color space format is the RGB color space format.

3. The method of claim 2, wherein the second color space format is the Y-Cr-Cb 4:2:0 color space format.

4. The method of claim 1, wherein the first and second color space formats comprise two different luminance-chrominance color space formats.

5. The method of claim 1, wherein transforming comprises applying a relationship to at least one pixel value of the image in the first color space format to obtain a pixel value in the second color space format.

6. The method of claim 5, wherein the relationship is applied substantially in accordance with the following equations:

$$Y(I,J)=0.299R(I,J)+0.587G(I,J)+0.114B(I,J)$$

$$Cr(I,J)=-0.169R(I,J)-0.331G(I,J)+0.500B(I,J)$$

$$Cb(I,J)=0.500R(I,J)-0.419G(I,J)-0.081B(I,J)$$

where R,G, and B denote different color planes in the RGB color space format, Y, Cr, and Cb denote different color planes in the Y-Cr-Cb 4:2:0 color space format, and I,J denote pixel locations.

7. The method of claim 1, wherein applying an upscaling scheme comprises applying an Inverse discrete wavelet transform to an image decomposed into subbands, at least one of the subbands comprising the at least one color plane of the transformed color image.

8. The method of claim 7, wherein the at least one of the subbands comprises an LL subband of the decomposed image.

9. The method of claim 8, wherein the remaining subbands of the decomposed image comprise only zeros.

10. An article comprising: a storage medium having stored thereon instructions to upscale a color image in a first color space format to a second color space format, the instructions, when executed by a system, resulting in: transforming the color image in the first color space format to the second color space format; and applying an upscaling scheme to a subset of the data representing the transformed color image, the subset of the data being less than the whole of the data representing the transformed color image and including at least one color plane of the transformed color image, the at least one color plane corresponding to one-of the color space dimensions of the second color space format.

11. The article of claim 10, wherein the first color space format is the RGB color space format.

12. The article of claim 11, wherein the second color space format is the Y-Cr-Cb 4:2:0 color space format.

13. The article of claim 10, wherein the first and second color space formats comprise two different luminance-chrominance color space formats.

14. The article of claim 10, wherein the instructions, when executed, further result in transforming the color image comprising applying a relationship to at least one pixel value of the image in the first color space format to obtain a pixel value in the second color space format.

15. The article of claim 14, wherein the instructions, when executed, further result in the relationship being applied substantially in accordance with the following equations:

$$Y(I,J)\ 0.299R(I,J)+0.587G(I,J)+0.114B(I,J)$$

$$Cr(I,J)=-0.169R(I,J)-0.331G(I,J)+0.500B(I,J)$$

$$Cb(I,J)=0.500R(I,J)-0.419G(I,J)-0.081B(I,J)$$

where R,G, and B denote different color planes in the RGB color space format, Y, Cr, and Cb denote different color planes in the Y-Cr-Cb 4:2:0 color space format, and I,J denote pixel locations.

16. The article of claim 10, wherein the instructions, when executed, further result in upscaling at least one color plane comprising applying an Inverse discrete wavelet transform to an image decomposed into subbands, at least one of the subbands comprising the at least one color plane of the transformed image.

17. The article of claim 16, wherein the instructions, when executed, further result in the at least one of the subbands comprising an LL subband of the decomposed image.

18. The article of claim 17, wherein the instructions, when executed, further result in the remaining subbands of the decomposed image comprise only zeros.

19. A method of upscaling a color image transformed into a selected color space format comprising:

appending zero subbands to a subset of the data representing the transformed color image, the subset of the data being less than the whole of the data representing the transformed color image and including at least one of the color planes of the transformed color image so that the at least one of the color planes forms an LL subband of a decomposed image and the appended subbands form LH, HL, and LL subbands of a decomposed image; and applying the inverse discrete wavelet transform to the decomposed image so as to form the upscaled color image in the selected color space format.

20. The method of claim 19, wherein the selected color space format comprises the Y-Cr-Cb 4:2:0 color space format.

* * * * *

UNITED STATES PATENT AND TRADEMARK OFFICE
CERTIFICATE OF CORRECTION

PATENT NO. : 6,628,827 B1
DATED : September 30, 2003
INVENTOR(S) : Acharya

Page 1 of 1

It is certified that error appears in the above-identified patent and that said Letters Patent is hereby corrected as shown below:

Column 3,
Line 59, after "Y", delete "so".

Signed and Sealed this

Fourth Day of May, 2004

JON W. DUDAS
*Acting Director of the United States Patent and Trademark Office*